US005991397A

United States Patent [19]
Han

[11] Patent Number: 5,991,397
[45] Date of Patent: Nov. 23, 1999

[54] VOICE PAGING SERVICE CONTROL METHOD IN A SWITCHING SYSTEM

[75] Inventor: Dong-Sik Han, Yongin, Rep. of Korea

[73] Assignee: SamSung Electronics Co., Ltd., Kyungki-do, Rep. of Korea

[21] Appl. No.: 08/861,692

[22] Filed: May 22, 1997

[30] Foreign Application Priority Data

May 22, 1996 [KR] Rep. of Korea .................. 96/17537

[51] Int. Cl.[6] ............................................. H04M 3/42
[52] U.S. Cl. ..................... 379/374; 379/159; 379/170; 379/214
[58] Field of Search ................... 379/210–214, 379/88.15, 88.17, 88.23, 88.24, 88.26, 159, 164, 170, 372, 373, 374, 67.1; 455/412–413

[56] References Cited

U.S. PATENT DOCUMENTS

| 4,850,012 | 7/1989 | Mehta et al. ................. 379/374 X |
| 4,922,490 | 5/1990 | Blakley ......................... 379/374 X |
| 4,922,526 | 5/1990 | Morganstein et al. ........ 379/374 X |
| 5,099,509 | 3/1992 | Morganstein et al. ............. 379/84 |
| 5,202,917 | 4/1993 | Wakai ............................. 379/170 X |
| 5,381,465 | 1/1995 | Carter et al. ................... 379/88.26 |
| 5,511,111 | 4/1996 | Serbetcioglu et al. ......... 379/88.01 |
| 5,526,406 | 6/1996 | Luneau .............................. 455/563 |
| 5,740,235 | 4/1998 | Lester et al. ...................... 370/170 |
| 5,850,435 | 12/1998 | Devillier ............................ 379/374 |

*Primary Examiner*—Scott Weaver
*Attorney, Agent, or Firm*—Robert E. Bushnell, Esq.

[57] ABSTRACT

A method for automatically providing voice paging information of a caller in a switching system having an automatic attendant function. The method includes the steps of controlling an automatic answering machine equipped in the switching system upon receiving an incoming call, thereby outputting an announcement message containing a voice paging announcement message, and waiting for input data from the caller. When voice paging request data is received during the waiting for the input data, the automatic answering machine is controlled to output a voice paging announcement message, thereby establishing a voice paging channel. The switching system also broadcasts a voice paging signal received from the caller, waits for a response of an extension subscriber, and establishes a channel for the incoming call when the extension subscriber responds, thereby executing a call service associated with the incoming call. When dialing information is received during the waiting for the input data, the name and extension number of a desired extension subscriber are identified from a subscriber table and then broadcasted. When the extension subscriber responds to the broadcasting, a terminating channel is established, thereby executing a call service associated with the incoming call.

8 Claims, 2 Drawing Sheets

VOICE PAGING SERVICE CONTROL METHOD IN A SWITCHING SYSTEM

CLAIM OF PRIORITY

This application makes reference to, incorporates the same herein, and claims all benefits accruing under 35 U.S.C. §119 from an application entitled Paging Service Control Method in Switching System earlier filed in the Korean Industrial Property Office on May 22, 1996, and there duly assigned Ser. No. 17537/1996 by that Office.

BACKGROUND OF THE INVENTION

1. Field of the Invention

The present invention relates to a call service control method in a digital switching system, and more particularly to a method for controlling an automatic attendant voice paging service in a digital switching system.

2. Description of the Related Art

In a switching system such as a private exchange or key telephone system, an automatic attendant function is provided. In accordance with such an automatic attendant function, an off-hook is automatically carried out in a switching system in response to an incoming ring from a central office line, thereby establishing a terminating channel. A voice announcement from the switching system is then transferred to a caller. If necessary, the voice announcement, which is stored in an automatic answering machine equipped in the switching system, may be optionally changed by the operator of the switching system. Thus, such a message for an automatic answering can be appropriately set in accordance with the characteristics of the switching system. In accordance with the voice announcement, the caller at the site of the central office line dials a desired extension number and a desired extension group number so that he can talk with a desired extension subscriber. The automatic attendant function, which is stored in an automatic attendant function card equipped in the switching system, is an edit-type voice announcement function. In accordance with such an edit-type voice announcement function, avariety of basic sentences are previously stored in the form of recorded voices. In accordance with a given situation, appropriate basic sentences are edited into a complete sentence which is, in turn, transferred as an announcement message. In a switching system having the above-mentioned automatic attendant function, it is possible to achieve a service associated with an incoming call signal from a central office line in accordance with a voice announcement without using any telephone operator.

In accordance with an automatic attendant service adopted in a conventional switching system having the above-mentioned automatic attendant function, an off-hook is first automatically carried out in the switching system in response to an incoming ring from a central office line, thereby establishing a terminating channel. The switching system then carries out a voice announcement function, thereby advising a caller at the side of the central office line of information about extension subscribers. When the caller dials a desired extension number and a desired extension group number in accordance with the voice announcement, the switching system senses the dialing and then sends a ring signal to a desired extension subscriber.

That is, when the switching system receives dialing information about a desired extension number, it sends a ring signal to a desired extension subscriber. Where the extension subscriber performs an off-hook in response to the ring signal, the switching system executes a call service function associated with an incoming call from the central office line. Where there is no response to the ring signal due to an absence of the extension subscriber or other reasons, one of other extension subscribers should respond to the incoming call signal and then execute a switching function. On the other hand, where the caller at the site of the central office line dials only the number of a desired extension group, one of extension subscribers belonging to the extension group carries out a call conversation in response to the ring signal and then switches the incoming call to a desired extension subscriber in accordance with an appropriate method.

Accordingly, the automatic attendant function used in the conventional switching system requires an extension subscriber capable of executing the function of a telephone operator or a switching function. In this case, however, a degradation in the efficiency of the automatic answering machine, which is expensive, occurs.

SUMMARY OF THE INVENTION

Therefore, an object of the invention is to provide a method for automatically providing voice paging information of a caller in a switching system having an automatic attendant function.

Another object of the invention is to provide a voice paging service control method capable of achieving a call service announcing function by use of an automatic attendant function while automatically achieving a voice paging service when a caller requests to provide a message to called party (subscriber).

In accordance with one aspect, the present invention provides a method for controlling a voice paging service in a switching system equipped with an automatic answering machine, comprising the steps of: controlling the automatic answering machine upon receiving an incoming call from a caller at the site of a central office line, thereby outputting an announcement message containing a message announcing the execution of a voice paging function, and waiting for a response to the announcement message; controlling the automatic answering machine upon receiving voice paging request data from the caller, thereby outputting a voice paging announcement message, and establishing a voice paging channel; broadcasting avoice paging signal received from the caller, and waiting for a response of an extension subscriber to the broadcasted voice paging signal; and establishing a channel for the incoming call when the extension subscriber responds to the broadcasted voice paging signal, thereby executing a call service associated with the incoming call.

In accordance with another aspect, the present invention provides a method for controlling a voice paging service in a switching system equipped with an automatic answering machine, comprising the steps of: controlling the automatic answering machine upon receiving an incoming call from a caller at the site of a central office line, thereby outputting an announcement message; identifying, from a subscriber table, the name and extension number of a desired extension subscriber corresponding to dialing information received from the caller; controlling the automatic answering machine, thereby broadcasting the identified name and extension number of the extension subscriber in a voice paging manner, and waiting for a response of the extension subscriber to the broadcasting; and establishing a channel for the incoming call when the extension subscriber responds to the broadcasting, thereby executing a call service associated with the incoming call.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT(S)

Figure 1:
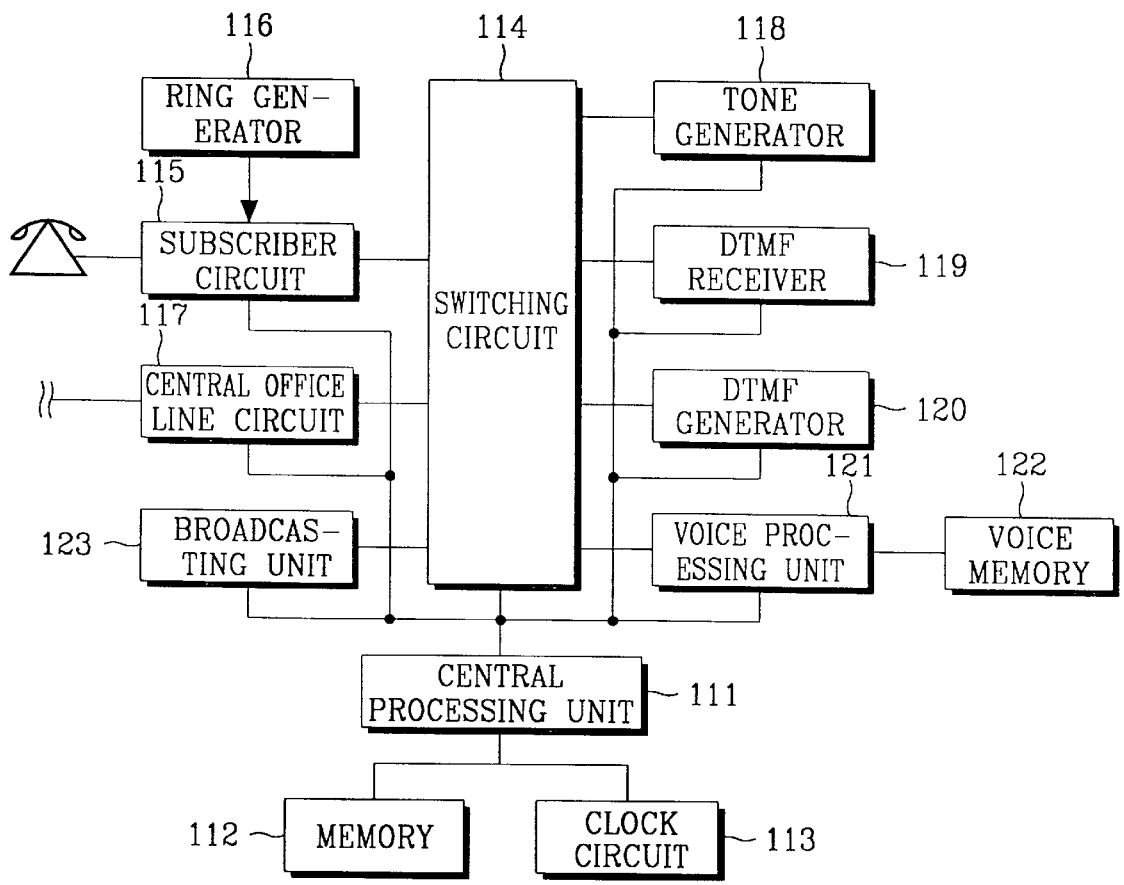
FIG. 1 is a block diagram illustrating a switching system having an automatic attendant function to which the present invention is applied.

FIG. 1 is a block diagram illustrating a switching system having an automatic attendant function. As shown in FIG. 1, the switching system includes a central processing unit 111 for not only controlling call switching, but also controlling the entire operation of a switching system to provide a variety of services to the user. A memory 112 is coupled to central processing unit 111. Memory 112 stores a program enabling central processing unit 111 to execute a basic call function and other functions. Memory 112 also stores initial service data. Data processed by central processing unit 111 is also temporarily stored in memory 112. Although not shown, memory 112 includes a ROM for storing the program and service data, a RAM for temporarily store data generated during the execution of the program. A clock circuit 113 is also coupled to central processing unit 111. Clock circuit 113 is a clock chip integrated circuit, and generates data about a current time and sends it to central processing unit 111. The switching system also includes a switching circuit 114 for switching various tones and voice data under the control of central processing unit 111. The switching system further includes a subscriber circuit 115 for not only supplying call current to the telephone set of a desired subscriber, but also performing a signal interface between the telephone set of the subscriber and switching circuit 114. The switching system further includes a ring generator 116 for generating a ring signal and supplying the generated ring signal to a subscriber line, and a central office line circuit 117 for seizing a central office line under the control of central processing unit 111, thereby establishing a central office line speech loop. The central office line circuit 117 also performs a signal interface between the central office line and switching circuit 114. A tone generator 118 is also provided which generates various tone signals under the control of central processing unit 111 and sends those signals to switching circuit 114. The switching system further includes a dual tone multifrequency (DTMF) receiver for analyzing a DTMF signal received from switching circuit 114, converting the DTMF signal into digital data, and sending the digital data to central processing unit 111. In this case, the DTMF signal applied to DTMF receiver 119 is a telephone number signal generated by the subscriber at the site of the central office line or a telephone number signal generated by the subscriber at the site of the extension. A DTMF transmitter 120 is also provided which converts digital data output from central processing unit 111 into a DTMF signal and sends the DTMF signal to switching circuit 114. The DTMF signal applied to DTMF transmitter 120 is a signal, indicative of the telephone number of the subscriber at the site of the central office line, generated when the subscriber of the central office line is called by the extension site. The switching system further includes a voice processing unit 121, a voice memory 122 and a broadcasting unit 123. The voice memory serves to record a voice message for executing a voice announcement function. The voice processing unit 121 performs a control for recording, in voice memory 122, a voice message generated from the subscriber or operator of the switching system under the control of central processing unit 111. The voice processing unit 121 accesses to a voice message associated with a situation generated in the switching system during a call service, reproduces the accessed voice message, and outputs it. In this case, voice processing unit 121 and voice memory 122 constitute an automatic answering machine. The voice processing unit 121 may comprise a digital signal processor. The broadcasting unit 123 serves to broadcast voice paging information about the caller under the control of central processing unit 111.

Figure 2:
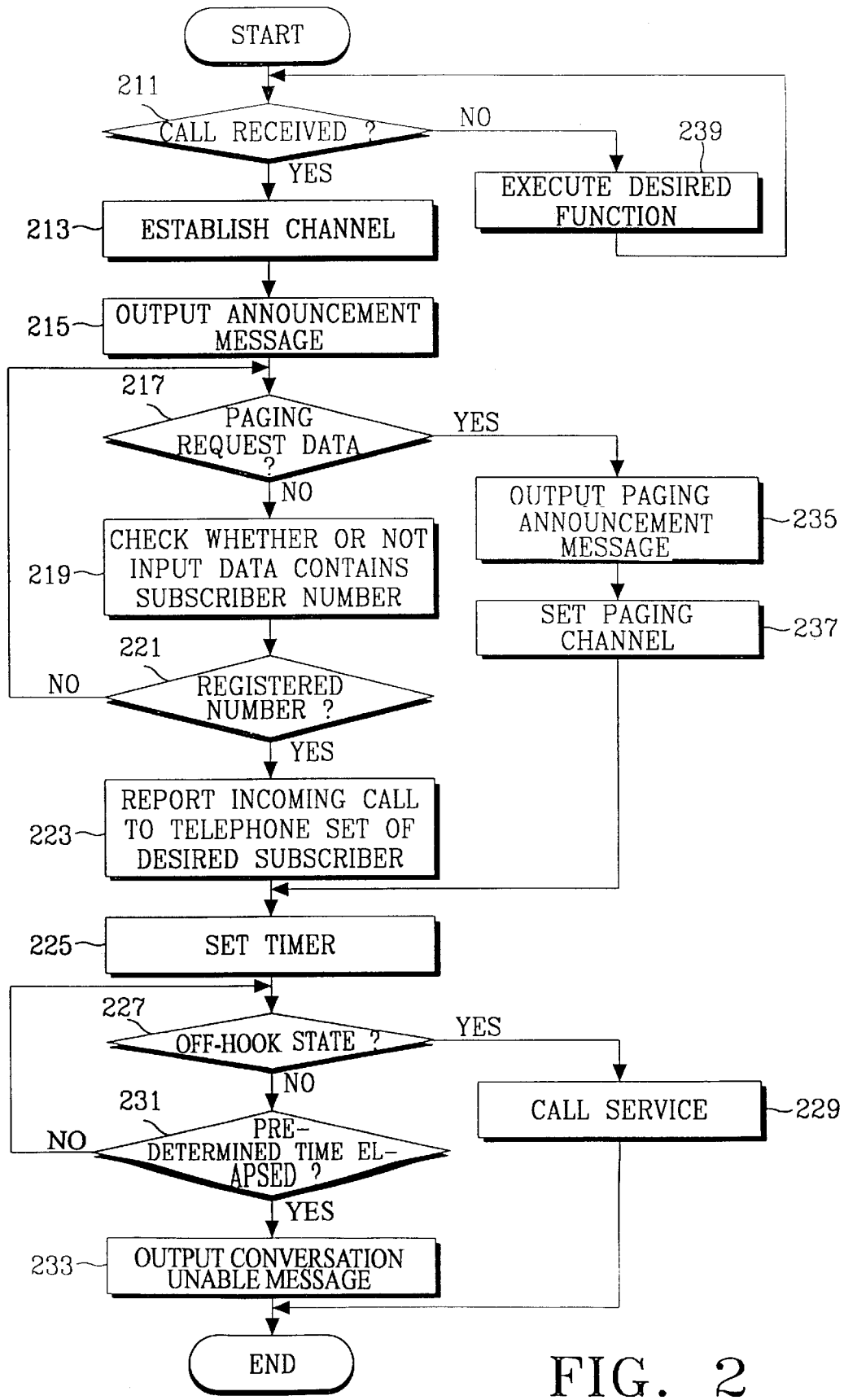
FIG. 2 is a flow chart illustrating a procedure for executing an automatic attendant function and an automatic voice paging function in the switching system having the configuration of FIG. 1 in accordance with an embodiment of the present invention.

FIG. 2 is a flow chart illustrating a procedure for executing an automatic attendant function and an automatic voice paging function in the switching system having the above-mentioned configuration in accordance with an embodiment of the present invention.

In accordance with the present invention, when an incoming ring signal from a central office line is received in the switching system via a telephone line, central office line circuit 117 of the switching system reports the receiving of the incoming ring signal to central processing unit 111. At step 211 of FIG. 2, central processing unit 111 senses the incoming ring signal. Accordingly, central processing unit 111 controls switching circuit 114 at step 213 to connect voice processing unit 121 to central office line circuit 117, thereby establishing a channel. The central processing unit 111 then controls voice processing unit 121 to output a voice announcement message in step 215. In accordance with the control of central processing unit 111, voice processing unit 121 accesses to an announcement message requesting the inputting of a number of a desired extension subscriber and then reproduces the accessed announcement message. The reprodired announcement message is then sent to switching circuit 114. Thus, the announcement message reproduced by voice processing unit 121 is transferred to the telephone line via switching circuit 114 and central office line circuit 117. When no ring signal is detected in step 211, central processing unit 111 executes any desired function in step 239 according to a design parameter set by the user while waiting to receive a call.

Since the subscriber at the site of central office line may not know the number of a desired extension subscriber, the announcement message also contains a voice paging request number (code) so that the caller can provide a voice message to the extension subscriber. That is, did information, which can be input by the caller, may include the number of a desired extension subscriber, the number of a group to which the extension subscriber belongs, and a voice paging request number adapted to page the extension subscriber. In this regard, the operator of the switching system should record the announcement message so as to allow the caller to generate the above-mentioned dial information. In an embodiment of the present invention, it is assumed that the number of a desired extension subscriber is set to four digits. It is also assumed that the voice paging request number is set to "0000".

After transferring the announcement message in step 215, central processing unit 111 controls switching circuit 114 to connect DTMF receiver 119 to central office line circuit 117. Under this condition, central processing unit 111 waits for key data input from the caller. When key data generated by the caller at the site of the central office line is applied to DTMF receiver 119 via central office line circuit 117 and switching circuit 114, DTMF receiver 119 converts the key data having the form of a DTMF signal into digital data which is, in turn, sent to central processing unit 111. Thereafter, central processing unit 111 checks at step 217 whether or not the input data corresponds to "0000" which is associated with voice paging request data.

Where it is determined at step 217 that the input data does not correspond to "0000", central processing unit 111 checks at step 219 whether or not the input data contains a subscriber number. When the input data contains a subscriber number, central processing unit 111 also checks at step 221 whether or not the subscriber number is that which is registered in a subscriber number table. Where the subscriber number associated with the input data is that which is registered in the subscriber number table, central processing unit 111 controls switching circuit 114 to connect voice processing unit 121 with broadcasting unit 123 at step 223. Under this condition, central processing unit 111 controls voice processing unit 121 to report, to a desired extension subscriber, the state in which an incoming call from the central office line is received. At this time, central processing unit 111 sends, to voice processing unit 121, control data for reproducing the name and number of the extension subscriber. The voice processing unit 121 then accesses to voice data, stored in voice memory 122, corresponding to the control data output from central processing unit 111. The voice processing unit 121 subsequently edits and reproduces the accessed voice data. The resultant voice message is sent to switching circuit 114. The voice message output from switching circuit 114 is then automatically announced, or broadcast, through broadcasting unit 123. The announced voice message contains the name and number of the extension subscriber. For example, the announced voice message may be a voice message "Mr. ****, please receive a call at the number ###".

Where such an automatic attendant function is not used, the incoming call receiving state may be reported by sending a ring signal to the telephone set of a desired extension subscriber in accordance with the conventional method. In this case, central processing unit 111 senses the incoming call-receiving state at step 221. At step 223, central processing unit 111 controls subscriber circuit 115 to send an output from ring generator 116 to the telephone set of a desired extension subscriber. Accordingly, a ring signal is applied to the telephone set of the extension subscriber.

After reporting the incoming call to the extension subscriber at step 223, central processing unit 111 sets a timer at step 225 in order to set a time in which the extension subscriber is allowed to respond to the ring signal. In an embodiment of the present invention, it is assumed that the set time of the timer is 10 seconds. When the extension subscriber executes an off-hook within the set time (10 seconds), central processing unit 111 senses the off-hook state at step 227. At step 229, central processing unit 111 then controls switching circuit 114 to connect a desired extension subscriber port of subscriber circuit 115 to central office line circuit 117. Under this condition, a call service function is executed.

However, when no off-hook is executed within the set time, central processing unit 111 senses this state at steps 227 and 231. In this case, central processing unit 111 controls switching circuit 114 to connect voice processing unit 121 to central office line circuit 117 at step 233. Under this condition, central processing unit 111 controls voice processing unit 121 to output a voice message announcing the impossibility of establishing a call conversation. Accordingly, voice processing unit 121 accesses data stored in voice memory 122 for announcing the impossibility of establishing the call conversation. The voice processing unit 121 then edits and reproduces the accessed data. The resultant message announcing the impossibility of establishing the call conversation is sent to switching circuit 114 which, in turn, sends the message to the caller at the site of the central office line via central office line circuit 117.

On the other hand, where it is determined at step 217 that the input data corresponds to "0000" indicative of voice paging request data, central processing unit 111 controls switching circuit 114 to connect voice processing unit 121 to central office line circuit 117 at step 235 so that an announcement message associated with execution of a voice paging function can be output. Under this condition, voice processing unit 121 is controlled to reproduce a voice message for announcing the execution of the voice paging function. Accordingly, voice processing unit 121 accesses data stored in voice memory 122 for announcing the execution of the voice paging function. The voice processing unit 121 subsequently edits and reproduces the accessed data. The resultant data is sent to switching circuit 114. The voice paging announcement message output from switching circuit 114 is then sent to the telephone line via central office line circuit 117. The voice paging announcement message may be a message "Please provide a message after the tone". Thereafter, central processing unit 111 controls switching circuit 114 to connect broadcasting unit 123 to central office line circuit 117. Under this condition, a voice paging channel is established in step 237. Accordingly, a voice message from the caller at the site of the central office line can be reproduced by broadcasting unit 123. The control procedure of central processing unit 111 then proceeds to step 225 so as to execute the steps following step 225 in the above-mentioned manner.

In accordance with the above-mentioned embodiment of the present invention, two automatic attendant functions are executed as follows.

In accordance with the first automatic attendant function, the switching system first transfers an announcement message in response to an incoming call from a central office line. When the caller at the site of the central office line subsequently dials the number of a desired extension subscriber or the number of an extension group to which the extension subscriber belongs, the switching system checks whether or not the extension subscriber or extension group is that which is registered in a subscriber table equipped in the switching system. Where the input number is that which is registered in the subscriber table, the name of the extension subscriber and associated extension number, which are previously recorded, are audibly edited in the form of a voice message The voice message is then announced, thereby reporting the incoming call.

In accordance with the second automatic attendant function, the switching system first transfers an announcement message for announcing the execution of a voice paging function in response to an incoming call from a central office line. Where the caller at the site of the central office line does not know the number of a desired extension subscriber or the number of an extension group to which the extension subscriber belongs, it generates voice paging request data. In response to the voice paging request data, the switching system announces the execution of a voice paging function while establishing a voice paging channel. In this state, the switching system broadcasts a voice paging signal generated from the caller at the site of the central office line to the extension subscriber without the extension subscriber having to answer the telephone. In this case, a call conversation service associated with the incoming call from the central office line can be executed when the extension subscriber performs an off-hook in response to the broadcasted voice paging signal.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a voice paging service in a switching system, comprising the steps of:

detecting an incoming call from a caller;

outputting an announcement message prompting said caller to input data corresponding to one of a code for providing a voice paging message and a subscriber number for contacting a subscriber;

determining whether said caller inputs said code in response to said announcement message;

outputting a message to said caller to prompt said caller to provide a voice message when it is determined that said caller has input said code;

establishing a voice paging channel between said caller and said subscriber;

providing said voice message from said caller to said subscriber over said voice paging channel;

setting a timer to set a predetermined time period;

checking for an off-hook state of a telephone of said subscriber;

establishing a communication channel between said caller and said subscriber when said off-hook state is detected within said predetermined time period; and providing a message to said caller indicating that communication with said subscriber is impossible when said off-hook state is not detected within said predetermined time period.

2. The method as set forth in claim 1, further comprising the steps of:

checking whether or not input data from said caller contains said subscriber number and determining whether said subscriber number is a registered number stored in memory when it is determined that said code has not been input;

ringing said telephone of said subscriber and providing an announcement reporting an incoming call to said subscriber when it is determined that said subscriber number is a registered number;

setting said timer to said predetermined time period;

checking for said off-hook state of said telephone of said subscriber;

stopping said ringing and establishing said communication channel between said caller and said subscriber when said off-hook state is detected within said predetermined time period; and providing said message to said caller indicating that communication with said subscriber is impossible when said off-hook state is not detected within said predetermined time period.

3. A method for controlling a voice paging service in a switching system, comprising the steps of:

detecting a ring signal from a caller over a central office line;

connecting a voice processing unit to a central office line circuit when said ring signal is detected;

outputting an a first message from said voice processing unit to said caller via said central office line circuit, wherein said first message prompts a user to input data corresponding to one of a code for inputting a voice message and a subscriber number for contacting a subscriber;

determining whether said caller inputs said code in response to said announcement message;

outputting a second message from said voice processing unit to said caller to prompt said caller to input a message when it is determined that said caller has input said code;

connecting said central office line circuit to a broadcast unit for receiving a voice message from said caller and broadcasting said voice message to said subscriber;

setting a timer in order to set a time period in which said subscriber can answer said incoming call;

establishing a communication channel between said caller and a telephone of said subscriber when said subscriber answers said call within said time period; and providing a third message to said caller indicating that communication with said subscriber is impossible when said subscriber does not answer said incoming call within said time period.

4. The method as set forth in claim 3, wherein said step of establishing a communication channel between said caller and said subscriber when said subscriber answers said call within said time period comprises detecting an off-hook state of said subscriber's telephone during said time period.

5. The method as set forth in claim 3, further comprising the steps of:

checking whether or not input data from said caller contains said subscriber number and determining whether said subscriber number is a registered number stored in memory when it is determined that said caller has not input said code;

connecting said voice processing unit to said broadcasting unit when it is determined that said subscriber number is a registered number and outputting a fourth message, wherein said fourth message is broadcast to said subscriber reporting an incoming call when it is determined that said subscriber number is a registered number;

ringing said subscriber's telephone;

setting said timer in order to set said time period in which said subscriber can answer said telephone;

stopping said ringing of said subscriber's telephone and establishing said communication channel between said caller and said subscriber when said subscriber answers said telephone within said time period; and providing said third message to said caller indicating that communication with said subscriber is impossible when said subscriber does not answer said telephone within said time period.

6. The method as set forth in claim 5, wherein said step of stopping said ringing of said subscriber's telephone and establishing said communication channel between said caller and said subscriber comprises detecting an off-hook state of said telephone during said time period.

7. A method for controlling a voice paging service in a switching system equipped with an automatic answering machine, comprising the steps of:

dedecting an incoming call from a caller's telephone;

outputting an announcement message from said automatic answering machine for prompting a caller to input data by actuating tone dial keys of said caller's telephone, wherein said input data selectively corresponds to one of a code to permit said caller to provide a voice paging message to a subscriber and an extension number for a subscriber's telephone to permit said caller to communicate with said subscriber;

decoding said input data, received in response to said announcement message, in a dual tone modulated frequency receiver to provide decoded data to a central processing unit;

checking, in said central processing unit, said decoded data to determine whether said decoded data corresponds to said code;

outputting a message from said automatic answering machine to said caller's telephone to prompt said caller to provide a voice message when it is determined that said decoded data corresponds to said code;

connecting a broadcast unit to a central office line for establishing a voice paging channel between said caller and said subscriber;

providing said voice message from said caller to said subscriber over said voice paging channel;

setting a timer to set a predetermined time period;

checking for an off-hook state of said subscriber's telephone;

establishing a communication channel between said caller and said subscriber when said off-hook state is detected within said predetermined time period; and providing a message from said automatic answering machine to said caller indicating that communication with said subscriber is impossible when said off-hook state is not detected within said predetermined time period.

8. The method as set forth in claim 7, further comprising the steps of:

checking, in said central processing unit, said decoded data to determine whether said decoded data corresponds to said extension number and determining whether said extension number is a registered number stored in memory when it is determined that said decoded data does not correspond to said code;

ringing said subscriber's telephone when it is determined that said subscriber number is a registered number;

connecting said automatic answering machine to said broadcast unit in order to broadcast a message announcing an incoming call to said subscriber;

setting said timer to said predetermined time period;

checking for said off-hook state of said subscriber's telephone;

stopping said ringing and establishing said communication channel between said caller and said subscriber when said off-hook state is detected within said predetermined time period; and providing said message to said caller indicating that communication with said subscriber is impossible when said off-hook state is not detected within said predetermined time period.

* * * * *